US012810074B2

(12) United States Patent
Kumar Choubey et al.

(10) Patent No.: US 12,810,074 B2
(45) Date of Patent: Nov. 24, 2026

(54) SYSTEMS AND METHODS FOR ZERO-SHOT TEXT CLASSIFICATION WITH A CONFORMAL PREDICTOR

(71) Applicant: Salesforce, Inc., San Francisco, CA (US)

(72) Inventors: Prafulla Kumar Choubey, San Jose, CA (US); Yu Bai, Belmont, CA (US); Nazneen Rajani, Mountain View, CA (US); Wenhao Liu, Redwood City, CA (US)

(73) Assignee: Salesforce, Inc., San Francisco, CA (US)

( * ) Notice: Subject to any disclaimer, the term of this patent is extended or adjusted under 35 U.S.C. 154(b) by 394 days.

(21) Appl. No.: 17/889,166

(22) Filed: Aug. 16, 2022

(65) Prior Publication Data

US 2023/0334245 A1 Oct. 19, 2023

Related U.S. Application Data

(60) Provisional application No. 63/331,135, filed on Apr. 14, 2022.

(51) Int. Cl.

*G06F 40/284* (2020.01)
*G06F 40/40* (2020.01)

(52) U.S. Cl.

CPC ............ *G06F 40/284* (2020.01); *G06F 40/40* (2020.01)

(58) Field of Classification Search

CPC ........ G06F 40/284; G06F 40/40; G06F 16/35; G06N 3/096

See application file for complete search history.

(56) References Cited

U.S. PATENT DOCUMENTS

2020/0251091 A1* 8/2020 Zhao ...................... G06N 20/00
2022/0414137 A1* 12/2022 Sewak .................. G06F 16/313
2023/0214679 A1* 7/2023 Xu ........................ G06F 16/345 706/47
2023/0334245 A1* 10/2023 Kumar Choubey .... G06F 16/35

FOREIGN PATENT DOCUMENTS

CN 110555083 A * 12/2019 ........... G06F 16/285
CN 112036447 A * 12/2020 ............. G06N 3/045
WO WO-2019046463 A1 * 3/2019 ............... G06N 3/08

OTHER PUBLICATIONS

Buchhold, B., & Dallmeyer, J. (2019). Zero-Shot Learning for Topic Detection in News Articles. Polibits, 60, 73-81. (Year: 2019).*

* cited by examiner

*Primary Examiner* — Richemond Dorvil
*Assistant Examiner* — Zeeshan Mahmood Shaikh
(74) *Attorney, Agent, or Firm* — Haynes and Boone, LLP

(57) ABSTRACT

Embodiments described herein provide a Conformal Predictor (CP) that reduces the number of likely target class labels CP. Specifically, the CP provides a model agnostic framework to generate a label set, instead of a single label prediction, within a pre-defined error rate. The CP employs a fast base classifier which may be used to filter out unlikely labels from the target label set, and thus restrict the number of probable target class labels while ensuring the candidate class labels set meets the pre-defined error rate.

20 Claims, 7 Drawing Sheets

| | ATIS | | | HWU64 | | | SNIPS | | | AGNEWS | | | YAHOO | | |
|---|---|---|---|---|---|---|---|---|---|---|---|---|---|---|---|
| | A ↑ | T ↓ | \|L\| ↓ | A ↑ | T ↓ | \|L\| ↓ | A ↑ | T ↓ | \|L\| ↓ | A ↑ | T ↓ | \|L\| ↓ | A ↑ | T ↓ | \|L\| ↓ |
| Entailment: *bart-large-mnli* | | | | | | | | | | | | | | | |
| Full | **71.5** | 1.0 | 17.0 | 49.3 | 1.0 | 64.0 | 76.7 | 1.0 | 7.0 | 75.9 | 1.0 | 4.0 | 51.8 | 1.0 | 10.0 |
| CP-Token | 70.1 | **0.63** | **9.1** | 49.4 | 0.79 | 47.6 | 75.8 | **0.88** | 5.9 | 75.5 | **0.91** | 3.5 | 51.4 | 0.91 | 9.7 |
| CP-Glove | 71.0 | 1.01 | 16.7 | 49.3 | 1.0 | 63.4 | 76.0 | 0.98 | 6.8 | 75.0 | 0.99 | 3.9 | 51.4 | 1.05 | 9.8 |
| CP-CLS | **71.5** | 0.98 | 9.2 | 49.3 | 0.71 | 30.59 | **77.0** | 0.98 | **3.5** | **76.2** | 0.99 | **2.4** | 51.7 | **0.80** | 8.1 |
| CP-Distil | **71.5** | 0.98 | 14.0 | **49.7** | **0.50** | **27.7** | 76.7 | 0.91 | 4.6 | 75.9 | 0.94 | 2.9 | **51.9** | 0.83 | **7.2** |
| Next Sentence Prediction: *bert-base-uncased* | | | | | | | | | | | | | | | |
| Full | 23.6 | 1.0 | 17.0 | 47.2 | 1.0 | 64.0 | 81.7 | 1.0 | 7.0 | 79.3 | 1.0 | 4.0 | 52.0 | 1.0 | 10.0 |
| CP-Token | 23.1 | **0.41** | **5.3** | 47.2 | 0.85 | 53.8 | 81.0 | 0.94 | 6.0 | 78.9 | **0.96** | 3.5 | 52.0 | 0.97 | 9.6 |
| CP-Glove | **23.9** | 0.99 | 16.4 | 47.1 | 1.0 | 63.0 | 80.8 | 1.0 | 6.8 | 78.3 | 0.99 | 3.9 | 51.8 | 1.0 | 9.6 |
| CP-CLS | 23.6 | 0.61 | 6.1 | **47.3** | **0.69** | **39.3** | 81.8 | **0.88** | 4.4 | **80.4** | 1.41 | **2.1** | 52.3 | **0.95** | **7.8** |
| CP-Distil | 23.7 | 1.51 | 16.1 | **47.3** | 1.15 | 57.7 | **82.7** | 1.97 | **4.2** | 80.1 | 2.13 | 3.0 | **52.6** | 1.69 | 8.8 |

*FIG. 8*

SYSTEMS AND METHODS FOR ZERO-SHOT TEXT CLASSIFICATION WITH A CONFORMAL PREDICTOR

CROSS REFERENCE

This application is a nonprovisional of and claims priority to U.S. nonprovisional application no. 63/331,135, filed Apr. 14, 2022, which is hereby expressly incorporated by reference herein in its entirety.

TECHNICAL FIELD

The embodiments relate generally to machine learning, and more specifically to systems and methods for improving efficiency of classification models.

BACKGROUND

Pre-trained language models may be used for text classification, e.g., given an input text, a classification label may be generated for the input sentence. Some pre-trained language models may be applied for zero-shot text classification, e.g., without being trained with training data associated with a particular classification label. Such zero-shot text classification models often rely on natural language inference (NLI) and next sentence prediction (NSP). For example, NLI is the task of determining whether a given "hypothesis" logically follows from a "premise," e.g., by generating an output predicting whether the "hypothesis" is True, False or Neutral given the "premise." NSP is a binary classification task predicting whether two sentences are consecutive or not. These models often employ cross-encoder architecture and infer by making a forward pass through the model for each label-text pair separately, which increases the computational cost to make inferences linearly in the number of labels. As a result, when the number of labels grows, the computational cost for text classification based on the set of labels may also grows accordingly.

Therefore, there is a need to improve the text classification efficiency.

BRIEF DESCRIPTION OF THE DRAWINGS

FIGS. 6-8 are data plots and table providing example results from data experiments of the conformal prediction framework described in FIGS. 1-5, according to embodiments described herein.

Figure 1:
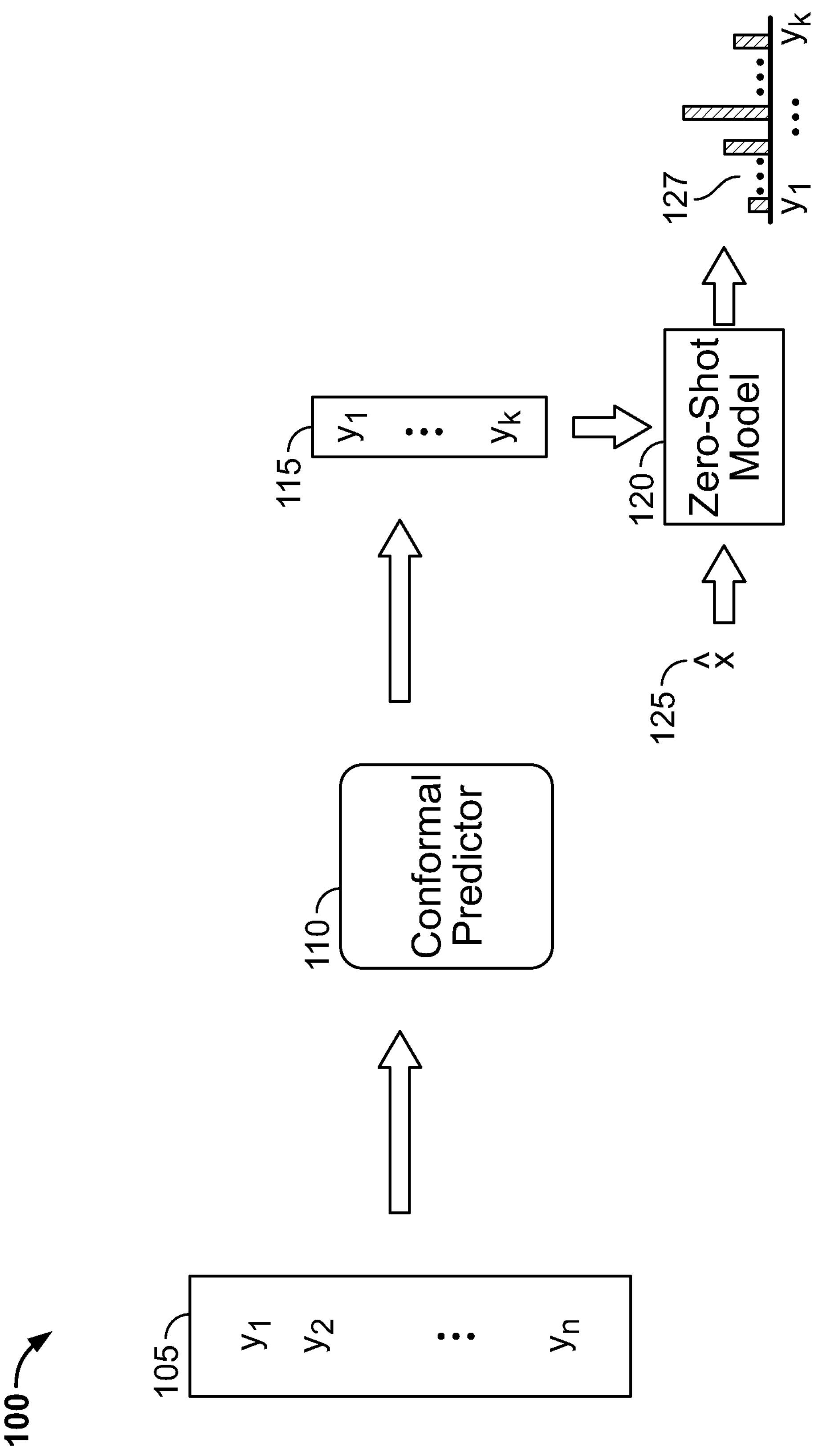
FIG. 1 shows a simplified block diagram illustrating a conformal prediction framework for improving efficiency in zero-shot text classification, according to embodiments described herein.

In the figures, elements having the same designations have the same or similar functions.

DETAILED DESCRIPTION

As used herein, the term "network" may comprise any hardware or software-based framework that includes any artificial intelligence network or system, neural network, or system and/or any training or learning models implemented thereon or therewith.

As used herein, the term "module" may comprise hardware or software-based framework that performs one or more functions. In some embodiments, the module may be implemented on one or more neural networks.

Zero-shot classification models may make a prediction according to a classification label, even if samples of such label were not previously observed during training. Such models use a similarity score between text and labels mapped to common embedding space, and calculate text and label embeddings independently and make only one forward pass over the text resulting in a minimal increase in the computation. Some other existing models may incorporate label information when processing the text, or may use generative modeling to generate text given label embedding, or may use label embedding based attention over text. All of these models may require multiple passes over the text, increasing the computational cost.

NLI/NSP-based zero-shot classification model may make inferences by defining a representative hypothesis sentence for each class label and producing a score corresponding to every pair of input text (i.e., premise) and label representative hypothesis. To compute the score, the NLI/NSP model employs full self-attention over the premise and hypothesis sentences which requires recomputing the encoding for each premise and hypothesis separately. This increases the computational cost and the time to make inferences linearly in the number of target class labels.

In particular, with large transformer-based pre-trained language models, the model size and the number of target labels could drastically reduce the prediction efficiency, increasing the computation and inference time, and may significantly increase the carbon footprint of making predictions.

In view of the need for computationally efficient based zero-shot text classification, embodiments described herein provide a Conformal Predictor (CP) that reduces the number of likely target class labels CP. Specifically, the CP provides a model agnostic framework to generate a label set, instead of a single label prediction, within a pre-defined error rate. The CP employs a fast base classifier which may be used to filter out unlikely labels from the target label set, and thus restrict the number of probable target class labels while ensuring the candidate class labels set meets the pre-defined error rate.

For example, the fast base classifier may predict on a calibration dataset comprising samples corresponding to all classification labels. The predictions may then be used to "calibrate" a nonconformity threshold between a prediction and a ground-truth label. Thus, given a testing data point, the fast base classifier may be used to generate a subset of classification labels that satisfy the nonconformity threshold with a prediction of the testing data point. The subset of classification labels are then used with the larger NLI/NSP-based zero-shot text classification models to make the final prediction of the testing data point.

FIG. 1 shows a simplified block diagram illustrating a CP framework 100 for improving efficiency in zero-shot text classification, according to embodiments described herein. The CP framework 100 comprises a conformal predictor 110, which improves the efficiency of NLI/NSP zero-shot classification models 120 by restricting the number of target labels. The conformal predictor 110 may comprise a fast but weak base classifier (as shown at 220 in FIG. 2) to produce a much smaller label set 115, e.g., $\{y^1, y^2, \ldots, y^k\}$ from the original large label set 105, e.g., $\{y^1, y^2, \ldots, y^n\}$. The reduced label set 115, which removes some of the target classes for the zero-shot model 120, are fed to the zero-shot model 120 for classifying an input text 125. In this way, the classification output of the zero-shot model 120 is limited to a distribution 127 over the reduced label set 115.

Figure 2:
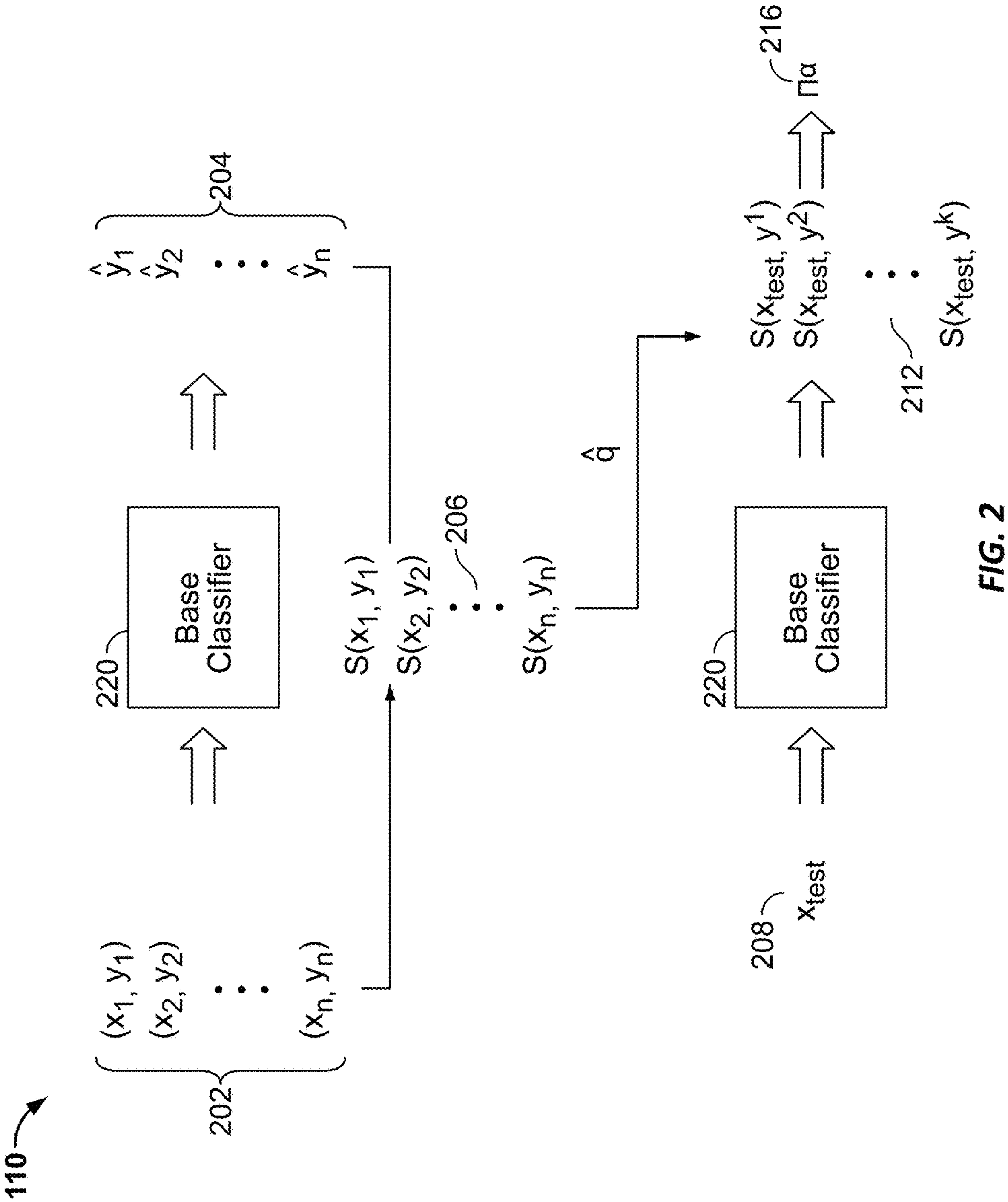
FIG. 2 shows a simplified block diagram illustrating an example structure of the conformal predictor shown in FIG. 1, according to embodiments described herein.

FIG. 2 shows a simplified block diagram illustrating an example structure of the conformal predictor 110 shown in FIG. 1, according to embodiments described herein. The conformal predictor 110 generates a reduced label set 216. For example, for a given error rate a and a base classifier 220, represented by f: $\mathbb{X} \rightarrow \mathbb{R}^K$, conformal predictor outputs a label set $\Gamma^\alpha$ 216 that also contains true class label y with probability at least 1-α.

In one embodiment, a calibration dataset 202 containing data samples covering all classification labels from the original label set 105, $\{(x_1, y_1), (x_2, y_2), \ldots, (x_n, y_n)\}$ is input to the base classifier 220. In one implementation, the calibration dataset 202 may be obtained from annotated data. In another implementation, when human-labeled data-set is unavailable, the large zero-shot classification model 120 may be used to label samples for calibration. As the goal is to obtain a label set that contains the class label which is most probably according to the zero-shot classification model 120, human-labeled samples may not be necessary. Using model-predicted labels in the calibration data 202 may achieve the desired coverage.

In one embodiment, the base classifier 220 may generate corresponding predictions 204, e.g., $\hat{y}_1, \hat{y}_2, \ldots, \hat{y}_n$, in response to the input $x_1, x_2, \ldots, x_n$ from the calibration dataset 202. A measure of non-conformity 206, represented by $s(x_i, y_i)$, i=1, n, may be used to describe the disagreement between the actual label $y_i$ and the prediction $\hat{y}_i$ from the base classifier 220. Thus, an empirical quantile of scores $s(x_1, y_1), \ldots, s(x_n, y_n)$ may be computed as $\hat{q}=\lceil(n+1)(1-\alpha)\rceil/n$.

In one implementation, the base classifier 220 is chosen to be computationally efficient when compared to the original zero-shot classification model 120. For example, the zero-shot classification model 120 may be an intent and/or topic classification model. Then the base classifier 220 may be built based on token overlap (referred to as "CP-Token"). For each target class label ($y^k \in \{y^1, \ldots, y^K\}$), the list of representative tokens $$(C_w^k)$$

that include all tokens in the calibration data samples corresponding to that class. Then, the non-conformity score may be computed as the percentage of common tokens between $$C_w^k$$

and the input text (x). Given #x defines the unique tokens in the input text x, the token overlap based non-conformity score is computed as:

$$s(x, y^k) = 1.0 - \frac{|C_w^k \cap x|}{\# x}.$$

In another implementation, the base classifier 220 may be built based on cosine similarity (referred to as "CP-Glove"). For example, the non-conformity score computed based on token overlap sometimes may suffer from sparsity unless a large representative words set for each target class label is used. Therefore, another way to compute the non-conformity score may be based on the cosine distance between bag-of-words (BoW) representation of target label description $$(C_w^k)$$

and input text ($x_E$). Static GloVe embeddings may be used to compute the BoW representations for labels. In this way, the non-conformity scores are computed as:

$$s(x, y^k) = 1.0 - \frac{C_E^k \cdot x_E}{\|C_E^k\|_2 \|x_E\|_2}.$$

In another implementation, the base classifier 220 may be a task-specific base classifier to generate label sets of smaller size. For example, a distilled BERT-base model that is fine-tuned using data labeled from predicted labels by the original zero-shot classification model 120 may serve as the base classifier 220. The negative of class logits may be used as the non-conformity scores.

In another implementation, the base classifier 220 may be another parameter-efficient NLI zero-shot model (different from the zero-shot classification model 120), such as a distil-Roberta-base-NLI model. While NLI-based zero-shot models may be computationally expensive, they may serve as a good base classifier for relatively larger pre-trained language models, with many parameters, or when there are many target class labels (e.g., 64 labels in HWU64). The non-conformity score may be computed as the negative entailment probability of each class.

Next, for a new exchangeable test data point 208, $x_{test}$, the base classifier 220 may in turn generate a prediction $\hat{y}_{test}$. Thus, scores 212, $s(x_{test}, y^1), \ldots, s(x_{test}, y^K)$ may in turn be computed for the K actual target labels using the prediction $\hat{y}_{test}$ generated by the base classifier 220. The quantile $\hat{q}$ is then applied to the set of scores 212 as a threshold to generate the reduced label set 216, e.g., $\Gamma^\alpha=\{y^k: s(x_{test}, y^k)<\hat{q}\}$, i.e., the classes corresponding to which the non-conformity score is lower than the q. The reduced label set $\Gamma^\alpha$ 216 is finally used with the large zero-shot model 120 to predict the final class label of $x_{test}$ 208 without reducing the coverage beyond the pre-defined error rate a.

In one embodiment, in order to reduce the average prediction set size while maintaining the computational efficiency, an ensemble of class label descriptions (i.e. hypothesis for NLI, nest sentence for NSP) may be used with the base CP classifier 220. The ensemble of descriptions helps to capture the surface-level variations in language and reduce average prediction set size without increasing the complexity of the base CP classifier. For cosine-similarity-based non-conformity scores, the mean of embeddings of all the descriptions corresponding to a given label may be incorporated during computation. Alternatively, all cosine similarities (or logits/probabilities for distilled zero-shot model) corresponding to all the descriptions of a given class may be computed and then their average is taken as the final non-conformity score.

In addition, beyond the settings for zero/few-shot classification described above, an ensemble of prompts or ensemble of verbalizer may be used in prompt-based classification models to reduce average prediction set size of CP. For example, when using prompts to extract knowledge from pre-trained language models, an ensemble (maximum or mean) of logits (or softmax probabilities) corresponding to different prompts (e.g., France is on the continent of [MASK], The continent of France is [MASK]) may be used for reducing average prediction set size. Likewise, for classification tasks, verbalizers (This text is about [Science]/[Technology]/[Mathematics]/etc.) may be ensembled while keeping the template fixed.

In some implementations, the availability of text from the target task for calibration (and training the base classifier 220) is generally assumed. While a zero-shot base classifier (e.g., CP-Token/Glove/Distil) can be used, in practice a few samples may be needed for the CP calibration. To tackle this issue, a small sized-calibration set with low chosen a may improve zero-shot classification efficiency without dropping the performance. Also, transferability of calibration set across such datasets is significant, e.g., when data samples corresponding to the actual zero-shot task is not available, data from another classification task (or a set of tasks) can be used for calibration, provided that the a is set to a low value.

It is noted that the CP framework 100 described in relation to FIGS. 1-2 is discussed in relation to NLI and NSP-based zero-shot text classification for illustrative purpose only. The CP framework 100 is model-agnostic, and may be applied to different types of classification models and/or tasks. For example, prompt-based few-shot classification models that autoregressively generate verbalizers may sometimes be slow, as the number of forward passes increases with the number of labels and verbalizer's tokens. The CP-framework described herein may be applied there to reduce the number of labels and improve efficiency. For another example, the proposed CP-framework may also be used to filter training examples when constructing prompts for in-context learning, where PLM is primed with a sequence of training examples. For a task with many target labels, a naively constructed prompt would require at least one training example for each label. However, with the CP-framework, the number of labels (and consequently the number of training examples) can be limited in the prompt, further reducing the computational cost.

For another example, the zero-shot classification model 120 may be an image classification model, and the base classifier 220 may be a more computationally efficient image classifier accordingly.

Computer Environment

Figure 3:
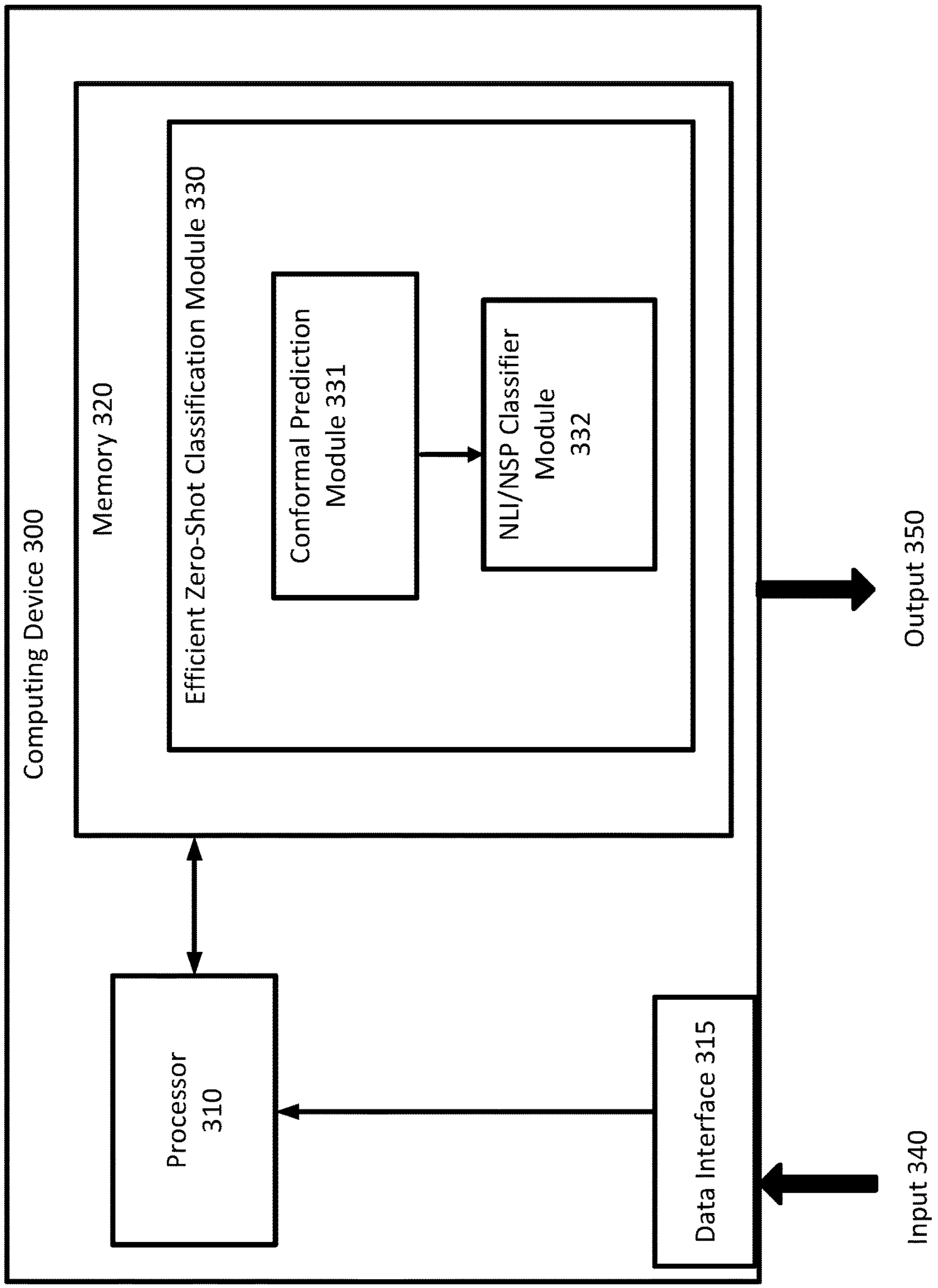
FIG. 3 is a simplified diagram of a computing device for implementing the Conformal Predictor based framework shown in FIGS. 1-2 for improving zero-shot text classification efficiency, according to some embodiments.

FIG. 3 is a simplified diagram of a computing device 300 for implementing the Conformal Predictor (CP) based framework shown in FIGS. 1-2 for improving zero-shot text classification efficiency, according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip, or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

In some examples, memory 320 may include non-transitory, tangible, machine readable media that includes executable code that when run by one or more processors (e.g., processor 310) may cause the one or more processors to perform the methods described in further detail herein. For example, as shown, memory 320 includes instructions for an efficient zero-shot classification module 330 that may be used to implement and/or emulate the systems and models, and/or to implement any of the methods described further herein. The efficient zero-shot classification module 330 may receive an input 340, e.g., a text input via the data interface 315 and generate an output 350 (e.g., a predicted classification label of the input text 340).

In one embodiment, the data interface 315 may be a user interface that receives a user submitted input, e.g., a voice input, a user entered text, and/or the like. In another embodiment, the data interface 315 may be a communication interface that receives training data from a remote data server (e.g., see data vendor servers 445, 470 and 480 in FIG. 4), such as the calibration dataset 202, testing data 208, and/or the like.

In some embodiments, the efficient zero-shot classification module 330 may include a conformal prediction module 331 (e.g., similar to 110 in FIG. 1), and a NLI/NSP classifier module 332 (e.g., similar to the zero-shot model 120 in FIG. 1). The conformal prediction module 331 is configured to generate a set of reduced classification labels for the NLI/NSP Classifier module 332 to determine a predicted class label as output 350, in response to an input 340.

In one embodiment, the efficient zero-shot classification module 330 and its submodules 331-332 may be implemented by hardware, software and/or a combination thereof.

Some examples of computing devices, such as computing device 300 may include non-transitory, tangible, machine readable media that include executable code that when run by one or more processors (e.g., processor 310) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 4:
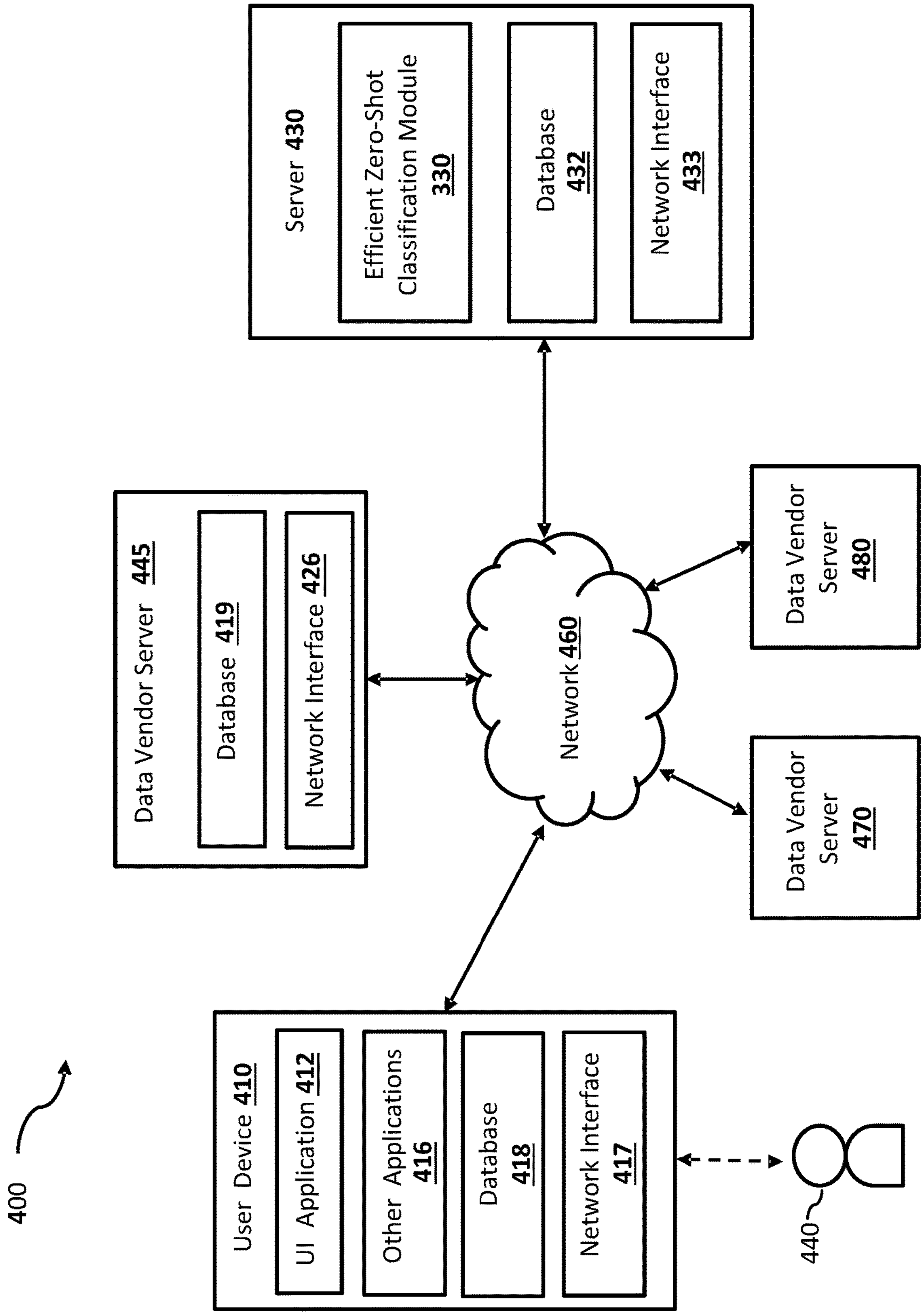
FIG. 4 is a simplified block diagram of a networked system suitable for implementing the conformal prediction framework described in FIGS. 1-2 and other embodiments described herein.

FIG. 4 is a simplified block diagram of a networked system suitable for implementing the CP framework described in FIGS. 1-2 and other embodiments described herein. In one embodiment, block diagram 400 shows a system including the user device 410 which may be operated by user 440, data vendor servers 445, 470 and 480, server 430, and other forms of devices, servers, and/or software components that operate to perform various methodologies in accordance with the described embodiments. Exemplary devices and servers may include device, stand-alone, and enterprise-class servers which may be similar to the computing device 100 described in FIG. 1, operating an OS such as a MICROSOFT® OS, a UNIX® OS, a LINUX® OS, or other suitable device and/or server-based OS. It can be appreciated that the devices and/or servers illustrated in FIG. 4 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 410, data vendor servers 445, 470 and 480, and the server 430 may communicate with each other over a network 460. User device 410 may be utilized by a user 440 (e.g., a driver, a system admin, etc.) to access the various features available for user device 410, which may include processes and/or applications associated with the server 430 to receive an output data anomaly report.

User device 410, data vendor server 445, and the server 430 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 400, and/or accessible over network 460.

User device 410 may be implemented as a communication device that may utilize appropriate hardware and software configured for wired and/or wireless communication with data vendor server 445 and/or the server 430. For example, in one embodiment, user device 410 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 410 of FIG. 4 contains a user interface (UI) application 412, and/or other applications 416, which may correspond to executable processes, procedures, and/or applications with associated hardware. For example, the user device 410 may receive a message indicating a classification of an input text (e.g., "yes" or "no" in terms of inference between an input hypothesis and an input premise) from the server 430 and display the message via the UI application 412. In other embodiments, user device 410 may include additional or different modules having specialized hardware and/or software as required.

In various embodiments, user device 410 includes other applications 416 as may be desired in particular embodiments to provide features to user device 410. For example, other applications 416 may include security applications for implementing client-side security features, programmatic client applications for interfacing with appropriate application programming interfaces (APIs) over network 460, or other types of applications. Other applications 416 may also include communication applications, such as email, texting, voice, social networking, and IM applications that allow a user to send and receive emails, calls, texts, and other notifications through network 460. For example, the other application 416 may be an email or instant messaging application that receives a prediction result message from the server 430. Other applications 416 may include device interfaces and other display modules that may receive input and/or output information. For example, other applications 416 may contain software programs for asset management, executable by a processor, including a graphical user interface (GUI) configured to provide an interface to the user 440 to view the output.

User device 410 may further include database 418 stored in a transitory and/or non-transitory memory of user device 410, which may store various applications and data and be utilized during execution of various modules of user device 410. Database 418 may store user profile relating to the user 440, predictions previously viewed or saved by the user 440, historical data received from the server 430, and/or the like. In some embodiments, database 418 may be local to user device 410. However, in other embodiments, database 418 may be external to user device 410 and accessible by user device 410, including cloud storage systems and/or databases that are accessible over network 460.

User device 410 includes at least one network interface component 419 adapted to communicate with data vendor server 445 and/or the server 430. In various embodiments, network interface component 419 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 445 may correspond to a server that hosts one or more of the databases 403*a-n* (or collectively referred to as 403) to provide training datasets including the calibration dataset 202 to the server 430. The database 403 may be implemented by one or more relational database, distributed databases, cloud databases, and/or the like.

The data vendor server 445 includes at least one network interface component 426 adapted to communicate with user device 410 and/or the server 430. In various embodiments, network interface component 426 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 445 may send asset information from the database 403, via the network interface 426, to the server 430.

The server 430 may be housed with the efficient zero-shot classification module 330 and its submodules described in FIG. 3. In some implementations, module 330 may receive data from database 419 at the data vendor server 445 via the network 460 to generate a reduced label set, based on which to further generate a classification label. The generated classification label may also be sent to the user device 410 for review by the user 440 via the network 460.

The database 432 may be stored in a transitory and/or non-transitory memory of the server 430. In one implementation, the database 432 may store data obtained from the data vendor server 445. In one implementation, the database 432 may store parameters of the efficient zero-shot classification model 330. In one implementation, the database 432 may store previously generated reduced label set, and the corresponding input feature vectors.

In some embodiments, database 432 may be local to the server 430. However, in other embodiments, database 432 may be external to the server 430 and accessible by the server 430, including cloud storage systems and/or databases that are accessible over network 460.

The server 430 includes at least one network interface component 433 adapted to communicate with user device 410 and/or data vendor servers 445, 470 or 480 over network 460. In various embodiments, network interface component 433 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 460 may be implemented as a single network or a combination of multiple networks. For example, in various embodiments, network 460 may include the Internet or one or more intranets, landline networks, wireless networks, and/or other appropriate types of networks. Thus, network 460 may correspond to small scale communication networks, such as a private or local area network, or a larger scale network, such as a wide area network or the Internet, accessible by the various components of system 400.

Work Flows

Figure 5:
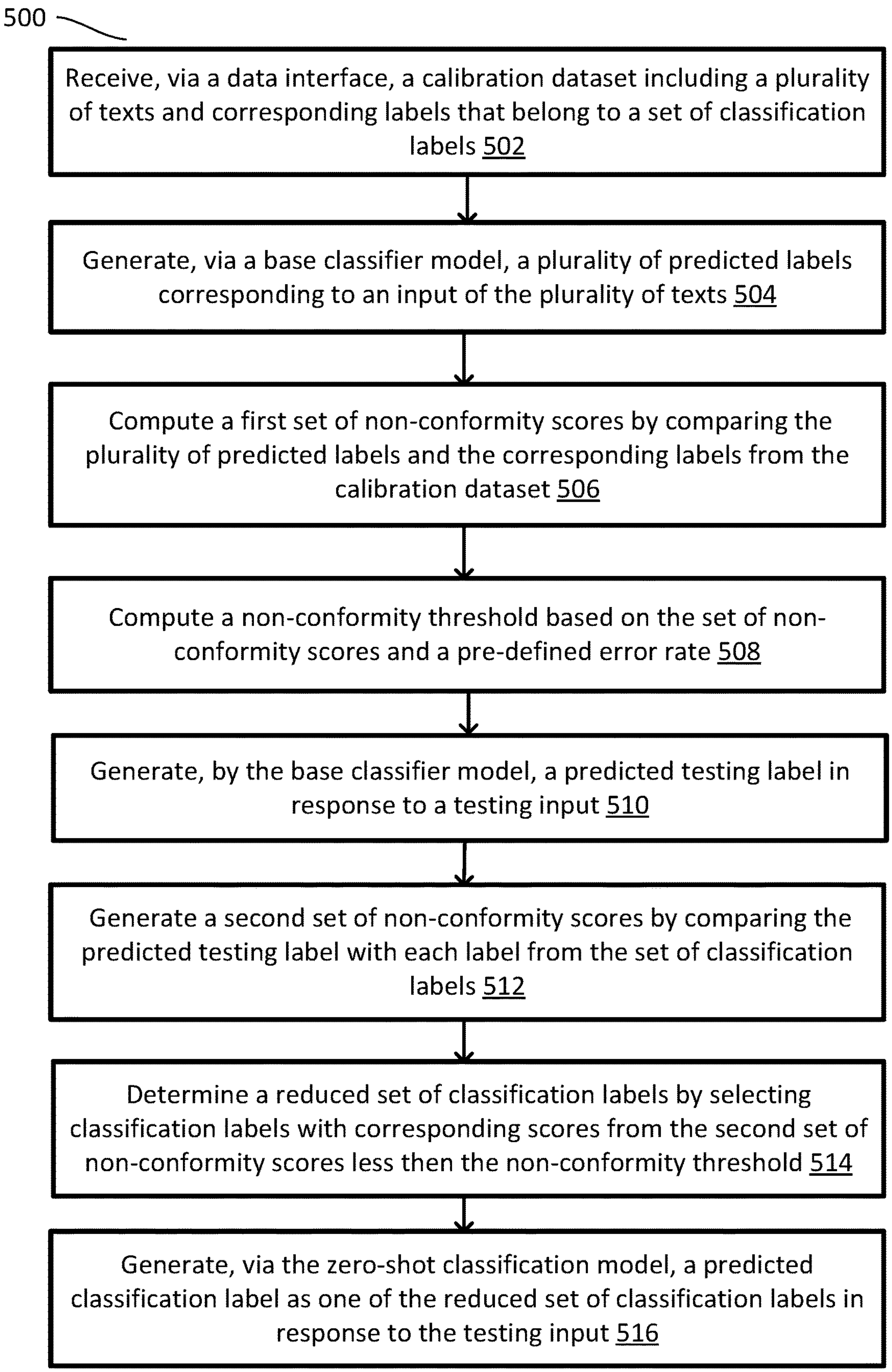
FIG. 5 is a simplified logic flow diagram illustrating a method for efficient zero-shot text classification, according to embodiments described herein.

FIG. 5 is a simplified logic flow diagram illustrating a method for efficient zero-shot text classification, according to embodiments described herein. One or more of the processes described in FIG. 5 may be implemented, at least in part, in the form of executable code stored on non-transitory, tangible, machine-readable media that when run by one or more processors may cause the one or more processors to perform one or more of the processes 502-516. In some embodiments, method 500 may correspond to the method used by the module 330 in FIGS. 3-4.

At step 502, method 500 performs receiving, via a data interface (e.g., 315 in FIG. 3), a calibration dataset (e.g., 202 in FIG. 2), including a plurality of texts and corresponding labels that belong to a set of classification labels. For example, the corresponding labels in the calibration dataset is generated by the zero-shot classification model in response to an input of the plurality of texts, e.g., when human-annotated labels are unavailable.

In some implementations, a given label from the set of classification labels comprises an ensemble of class descriptions, including any of a hypothesis in natural language inference, or a next sentence for next sentence prediction. Or given label from the set of classification labels comprises an ensemble of prompts or an ensemble of verbalizer when the zero-shot classification model is a prompt-based classification model.

At step 504, method 500 performs generating, via a base classifier model (e.g., 220 in FIG. 2), a plurality of predicted labels (e.g., prediction labels 204 in FIG. 2) corresponding to an input of the plurality of texts from the calibration dataset. For example, the base classifier has a smaller size or is more computationally efficient than the zero-shot classification model to reduce computational complexity.

At step 506, method 500 performs computing a first set of non-conformity scores (e.g., scores 206 in FIG. 2) by comparing the plurality of predicted labels (e.g., label predictions 204 in FIG. 2) and the corresponding labels from the calibration dataset (e.g., 202 in FIG. 2). For example, the non-conformity scores may be computed based on a percentage of common tokens between representative tokens corresponding to each classification label and a specific text from the calibration dataset. For another example, the non-conformity scores may be computed based on a cosine distance between a bag-of-words representation of each classification label description and a specific text from the calibration dataset. For another example, the non-conformity scores may be computed as negative of class logits generated by the base classification model in response to a specific text from the calibration dataset. For another example, the non-conformity scores may be computed as negative entailment probabilities logits generated by the base classification model in response to a specific text from the calibration dataset.

At step 508, method 500 performs computing a non-conformity threshold based on the first set of non-conformity scores (e.g., scores 206 in FIG. 2) and a pre-defined error rate (e.g., rate a as described in relation to FIG. 2).

At step 510, method 500 performs generating, by the base classifier model (e.g., 220 in FIG. 2), a predicted testing label in response to a testing input (e.g., 208 in FIG. 2).

At step 512, method 500 performs generating a second set of non-conformity scores (e.g., scores 212 in FIG. 2) by comparing the predicted testing label with each label from the set of classification labels.

At step 514, method 500 performs determining a reduced set of classification labels (e.g., reduced label set 216 in FIG. 2) by selecting classification labels with corresponding scores from the second set of non-conformity scores less than the non-conformity threshold.

At step 516, method 500 performs generating, via the zero-shot classification model (e.g., model 120 in FIG. 1) a predicted classification label (e.g., label distribution 127 in FIG. 1) as one of the reduced set of classification labels in response to the testing input (e.g., 125 in FIG. 1, or 208 in FIG. 2).

It is noted that method 500 is discussed in relation to text classification for illustrative purpose only. Method 500 is model-agnostic, and may be applied to different types of classification models and/or tasks.

Example Data Experiment and Performance

The CP-based framework described in FIGS. 1-5 is evaluated on a test set of intent classification datasets (SNIPS described in Coucke et al., SNIPS voice platform: an embedded spoken language understanding system for private-by-design voice interfaces. ArXiv, abs/1805.10190, 2018, ATIS described in Tur et al., What is left to be understood in ATIS? In 2010 IEEE Spoken Language Technology Workshop, pages 19-24, 2010, and HWU64 described in Liu et al., Benchmarking natural language understanding services for building conversational agents, in proceedings of International Workshop on Spoken Dialog System Technology, 2019) and topic (AG's news and Yahoo! Answers described in Zhang et al., Character-level convolutional networks for text classification, in Proceedings of the 28th International Conference on Neural Information Processing Systems—Volume 1, page 649-657, 2015) classification datasets. SNIPS, ATIS, HWU64, AG's news and Yahoo! Answers have 7, 17, 64, 4 and 10 target labels respectively. A moderately sized BART-large (NLI) described in Lewis et al., BART: Denoising sequence-to-sequence pre-training for natural language generation, translation and comprehension, in Proceedings of the 58th Annual Meeting of the Association for Computational Linguistics, pp. 7871-7880, 2020, is used as the zero-shot classification model and a small BERT-base (NSP) pre-trained language model is used as the base classifier in the CP framework. The "facebook/bart-large-nli" and "bert-base-uncased" models from the Hugging Face hub (described in Wolf et al., Transformers: State-of-the-art natural language processing, in Proceedings of the 2020 Conference on Empirical Methods in Natural Language Processing: System Demonstrations, pages 38-45, 2020) as the zero-shot NLI and HSP baselines.

For example, the entire training set of intent datasets and 5000 samples from the validation set of topic datasets are used to calibrate CP-Token, CP-Glove and CP-Distil. For CP-CLS, the entire training set of intent datasets and 2500 samples from the validation set of topic datasets to train the base classifier, and the entire validation set of intent datasets and 2500 samples from the validation set of topic datasets for calibration.

For the CP-Distil base classifier, "cross-encoder/nli-distilroberta-base" model from the Hugging Face hub is used. The text is only to be classified (without labels) for calibrating base classifiers and training CP-CLS base classifier. The zero-shot classification model is used to label the corresponding training and calibration samples.

Figure 6:
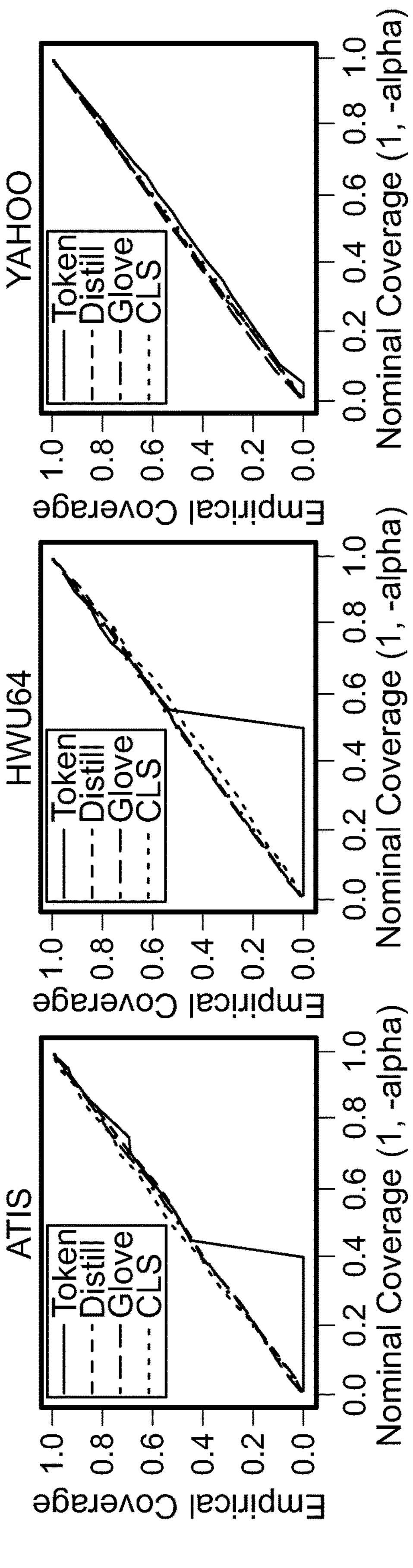
Figure 7:
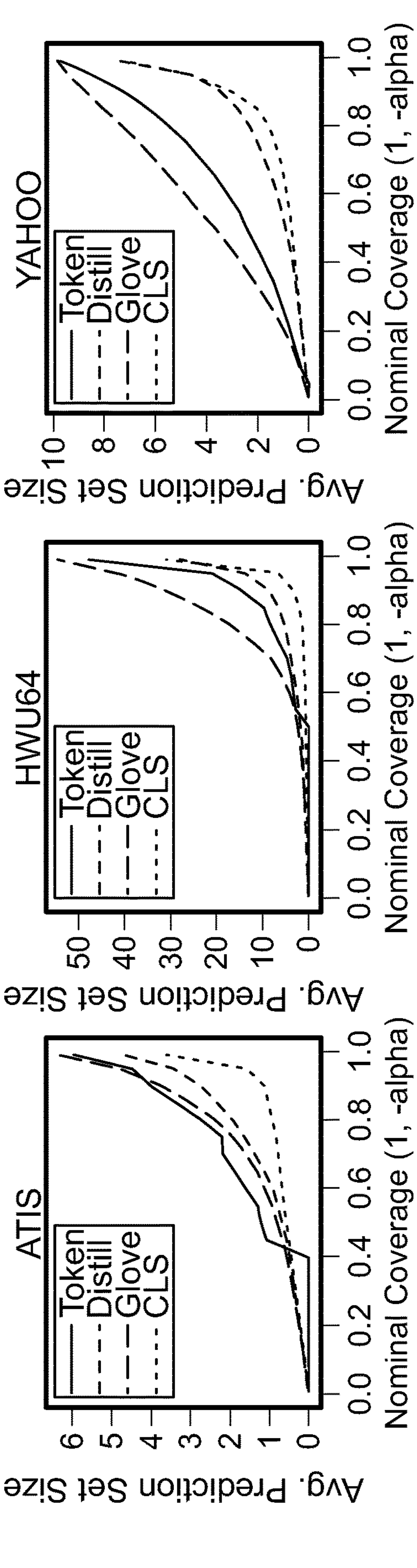

FIGS. 6-7 show the empirical coverage and the average label set (ALS) size of four base classifiers on ATIS, HWU64 and Yahoo! Answers datasets. Coverage defines the proportion of samples for which the predicted set contains the 0shot model-predicted label. ALS size equals the average number of labels in the set predicted by the CP base classifier.

FIG. 8 compares the accuracy (A), average inference time (T) and the average size of label set (ALS size) (ILI) used with the 0shot model. Average inference time is reported relative to the full model. "Full" represents the 0shot model that uses the full label set. During inference, one batch for all text-label pairs are created in a sample. For instance, with 64 labels, a batch includes 64 text-label pairs where each pair consists of text and one label. This allows to measure the reduction in inference time while fully utilizing the available compute resources.

The results in FIGS. 6-7 show the CP framework achieves a valid coverage. It is observed that for smaller values of a, all four base classifiers achieve valid coverage (FIG. 6), i.e., empirical and nominal coverages are identical, implying that CP framework may be used to filter unlikely target labels without dropping performance below the low predefined error rate a. For large $\alpha$ (>~0.5), empirical coverage drops to 0 on intent datasets for token overlap-based non-conformity score. The reduced coverage for token overlap at lower a results from an empty label set, as evident from 0 ALS size in FIG. 7.

CP reduces the average number of labels for the 0shot model. It is observed that stronger base classifiers (CLS and Distil) provide lower ALS size for the same empirical (or nominal) coverage (FIG. 7). On average, CP-CLS provides the lowest ALS size, reducing average number of labels for both 0shot2 models by roughly 41% (FIG. 8). This suggests that fine-tuning a base classifier should be preferred when unlabeled samples are easily available.

A simpler and efficient CP base classifier may reduce the inference time the most. It is observed that CP-Token achieves the best inference time with the NLI model on ATIS, SNIPS and AG's news datasets, and with the NSP model on ATIS and AG's news datasets. On the other hand, it achieves the lowest ALS size for both models only on the ATIS dataset. Minimal complexity for calculating token-overlap adds negligible overhead to the 0shot model, thus, achieving the best speed up despite higher ALS size in several cases.

Also, CP base classifier needs to be computationally inexpensive. CP-Distil improves inference time for the NLI model on all datasets but fails to do so for the NSP model, despite reduced ALS size. This ineffectiveness is explained by the comparable inference time for the base (distil-nli) classifier and the 0shot NSP model. When building the CP, it is imperative to select a base classifier which is very economical relative to the 0shot model. CP improves efficiency the most on the dataset with many labels. It is observed that the maximum speed up on HWU64 and ATIS datasets. This is unsurprising given the relatively higher number of possible target labels for both datasets, emphasizing the benefit of CP for tasks with many target labels.

CP performs comparable to the 0shot model. CP-based label filtering retains the performance of the corresponding models that use a full label set. Among the four base classifiers, CP-Token performs the worst (−0.46% absolute drop) and CP-Distil performs the best (+0.31% absolute gain) on the average accuracy. It is noteworthy that the accuracy increases in many cases, suggesting that pruning label space using a CP may remove noisy labels and boost the performance.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method for efficient zero-shot classification of classifying a topic for an input text from a news source using a conformal predictor framework that includes a zero-shot classification model implemented as a transformer-based pre-trained language model employing a cross-encoder architecture that performs a separate forward pass through the transformer-based pre-trained language model for the input text and a base classifier implemented as a distilled transformer model having a smaller number of model parameters than the zero-shot classification model coupled together, the method comprising:

receiving, at the zero-shot classification model having a first computational efficiency and associated with a set of a plurality of classification labels having one or more classification labels that the zero-shot classification model has not been trained on, the input text;

generating, via the base classifier having a second computational efficiency higher than the first computational efficiency and implemented on one or more processors, a subset of at least one classification label having a fewer number of classification labels from the set of classification labels for the input text by:

generating, via the base classifier, a first set of non-conformity scores corresponding to the set of the plurality of classification labels based on a calibration dataset configured to calibrate a nonconformity threshold for selectively restricting classification labels;

computing an empirical quantile of the first set of non-conformity scores as the non-conformity threshold based on the first set of non-conformity scores and a pre-defined error rate, the empirical quantile being inversely proportional to a number of the non-conformity scores in the first set;

receiving, by the base classifier, the input text as an input;

generating, via the base classifier, a class prediction of the input text;

generating, via the base classifier, a second set of non-conformity scores, wherein each non-conformity score in the second set is obtained by comparing the class prediction of the input text and each label from the set of classification labels;

determining the subset of classification labels by selecting classification labels with corresponding non-conformity scores from the second set of non-conformity scores that are less than the non-conformity threshold;

receiving, by the zero-shot classification model implemented on one or more processors, the input text as an input;

generating, via the zero-shot classification model, a predicted classification label selected from the subset of classification labels for the input text; and predicting, a text classification of the input text from the news source based on the predicted classification label; and transmitting, via a communication interface, the text classification to a user device, the transmitting causing the user device to display the text classification of the input text from the news source on a graphical user interface of the user device.

2. The method of claim 1, wherein the base classifier has a smaller size than the zero-shot classification model.

3. The method of claim 1, wherein the first set of non-conformity scores are generated by:

receiving a calibration dataset including a plurality of texts and corresponding a plurality of labels that belong to the set of classification labels;

generating, via the base classifier, a plurality of predicted labels corresponding to an input of the plurality of texts; and computing the first set of non-conformity scores by comparing the plurality of predicted labels and the corresponding plurality of labels from the calibration dataset.

4. The method of claim 3, wherein the first set of non-conformity scores are computed based on a percentage of common tokens between representative tokens corresponding to each classification label and a specific text from the calibration dataset.

5. The method of claim 3, wherein the first set of non-conformity scores are computed based on a cosine distance between a bag-of-words representation of each classification label description and a specific text from the calibration dataset.

6. The method of claim 3, wherein the first set of non-conformity scores are computed as negative of class logits generated by the base classifier in response to a specific text from the calibration dataset.

7. The method of claim 3, wherein the first set of non-conformity scores are computed as negative entailment probabilities logits generated by the base classifier in response to a specific text from the calibration dataset.

8. The method of claim 3, wherein the corresponding labels in the calibration dataset are generated by the zero-shot classification model in response to an input of the plurality of texts.

9. The method of claim 1, wherein a given label from the set of classification labels comprises an ensemble of class descriptions, including a hypothesis in a natural language inference, or a next sentence for next sentence prediction; or an ensemble of prompts or an ensemble of verbalizer when the zero-shot classification model is a prompt-based classification model.

10. The method of claim 1, wherein the calibration dataset comprises data corresponding to a similar task when calibration data from a zero-shot task is unavailable.

11. The method of claim 1, wherein the empirical quantile is independent of any prediction probability and is model agnostic.

12. A system for an efficient conformal predictor framework comprising a base classifier and a zero-shot classification model implemented as a transformer-based pre-trained language model employing a cross-encoder architecture that performs a separate forward pass through the transformer-based pre-trained language model for the input text and the base classifier implemented as a distilled transformer model having a smaller number of model parameters than the zero-shot classification model coupled together for classifying a topic for an input text from a news source, the system comprising:

a communication interface that receives the input text;

a memory storing:

the zero-shot classification model having a first computational efficiency and associated with a set of a plurality of classification labels having one or more classification labels that the zero-shot classification model has not been trained on;

the base classifier having a second computational efficiency higher than the first computational efficiency; and a plurality of processor-executable instructions for efficient zero-shot classification; and one or more hardware processors reading and executing the plurality of processor-executable instructions from the memory to perform operations comprising:

generating, via the base classifier implemented on one or more processors, a subset of at least one classification label having a fewer number of classification labels from the set of classification labels for the input text by:

generating, via the base classifier, a first set of non-conformity scores corresponding to the set of the plurality of classification labels based on a calibration dataset;

computing an empirical quantile of the first set of non-conformity scores as a non-conformity threshold based on the first set of non-conformity scores and a pre-defined error rate configured to calibrate a nonconformity threshold for selectively restricting classification labels, the empirical quantile being inversely proportional to a number of the non-conformity scores in the first set;

receiving, by the base classifier, the input text as an input;

generating, via the base classifier, a class prediction of the input text;

generating, via the base classifier, a second set of non-conformity scores, wherein each non-conformity score in the second set is obtained by comparing the class prediction of the input text and each label from the set of classification labels;

determining the subset of classification labels by selecting classification labels with corresponding non-conformity scores from the second set of non-conformity scores that are less than the non-conformity threshold;

receiving, by the zero-shot classification model implemented on one or more processors, the input text as an input;

generating, via the zero-shot classification model, a predicted classification label selected from the subset of classification labels for the input text; and predicting, a text classification of the input text from the news source based on the predicted classification label; and transmitting, via a communication interface, the text classification to a user device, the transmitting causing the user device to display the text classification of the input text from the news source on a graphical user interface of the user device.

13. The system of claim 12, wherein the base classifier has a smaller size than the zero-shot classification model.

14. The system of claim 12, wherein the first set of non-conformity scores are generated by:

receiving a calibration dataset including a plurality of texts and corresponding a plurality of labels that belong to the set of classification labels;

generating, via the base classifier, a plurality of predicted labels corresponding to an input of the plurality of texts; and computing the first set of non-conformity scores by comparing the plurality of predicted labels and the corresponding plurality of labels from the calibration dataset.

15. The system of claim 14, wherein the first set of non-conformity scores are computed based on a percentage of common tokens between representative tokens corresponding to each classification label and a specific text from the calibration dataset.

16. The system of claim 14, wherein the first set of non-conformity scores are computed based on a cosine distance between a bag-of-words representation of each classification label description and a specific text from the calibration dataset.

17. The system of claim 14, wherein the first set of non-conformity scores are computed as negative of class logits generated by the base classifier in response to a specific text from the calibration dataset.

18. The system of claim 14, wherein the first set of non-conformity scores are computed as negative entailment probabilities logits generated by the base classification model in response to a specific text from the calibration dataset.

19. The system of claim 14, wherein the corresponding labels in the calibration dataset are generated by the zero-shot classification model in response to an input of the plurality of texts.

20. A non-transitory processor-readable storage medium storing a plurality of processor-executable instructions for an efficient conformal predictor framework comprising a base classifier and a zero-shot classification model implemented as a transformer-based pre-trained language model employing a cross-encoder architecture that performs a separate forward pass through the transformer-based pre-trained language model for the input text and the base classifier implemented as a distilled transformer model having a smaller number of model parameters than the zero-shot classification model coupled together for classifying a topic for an input text from a news source, the plurality of processor-executable instructions executed by one or more hardware processors to perform operations comprising:

receiving, at a zero-shot classification model having a first computational efficiency and associated with a set of a plurality of classification labels having one or more classification labels that the zero-shot classification model has not been trained on, the input text;

generating, via a base classifier having a second computational efficiency higher than the first computational efficiency implemented on one or more processors, a subset of at least one classification label having a fewer number of classification labels from the set of classification labels for the input text by:

generating, via the base classifier, a first set of non-conformity scores corresponding to the set of the plurality of classification labels based on a calibration dataset configured to calibrate a nonconformity threshold for selectively restricting classification labels;

computing an empirical quantile of the first set of non-conformity scores as a non-conformity threshold based on the first set of non-conformity scores and a pre-defined error rate, the empirical quantile being inversely proportional to a number of the non-conformity scores in the first set;

receiving, by the base classifier, the input text as an input;

generating, via the base classifier, a class prediction of the input text;

generating, via the base classifier, a second set of non-conformity scores, wherein each non-conformity score in the second set is obtained by comparing the class prediction of the input text and each label from the set of classification labels;

determining the subset of classification labels by selecting classification labels with corresponding non-conformity scores from the second set of non-conformity scores that are less than the non-conformity threshold;

receiving, by the zero-shot classification model implanted on one or more processors, the input text as an input;

generating, via the zero-shot classification model, a predicted classification label selected from the subset of classification labels for the input text; and predicting, a text classification of the input text from the news source based on the predicted classification label; and transmitting, via a communication interface, the text classification to a user device, the transmitting causing the user device to display the text classification of the input text from the news source on a graphical user interface of the user device.

* * * * *